US010659539B2

(12) United States Patent
Liu et al.

(10) Patent No.: US 10,659,539 B2
(45) Date of Patent: *May 19, 2020

(54) INDEPENDENT INTERNET CONNECTION GENERATION

(71) Applicant: INTERNATIONAL BUSINESS MACHINES CORPORATION, Armonk, NY (US)

(72) Inventors: Tao Liu, Beijing (CN); Han Yang Xu, Shanghai (CN); Xiao Yun Xu, Beijing (CN); Jun Feng Yuan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/418,408

(22) Filed: May 21, 2019

(65) Prior Publication Data
US 2019/0273785 A1 Sep. 5, 2019

Related U.S. Application Data

(63) Continuation of application No. 15/220,919, filed on Jul. 27, 2016, now Pat. No. 10,397,337.

(51) Int. Cl.
G06F 15/16 (2006.01)
H04L 29/08 (2006.01)
H04L 29/12 (2006.01)

(52) U.S. Cl.
CPC .......... H04L 67/141 (2013.01); H04L 61/106 (2013.01); H04L 61/1529 (2013.01); H04L 61/605 (2013.01)

(58) Field of Classification Search
CPC .............................. H04L 61/141; H04L 61/157
(Continued)

(56) References Cited

U.S. PATENT DOCUMENTS 8,965,349 B2 2/2015 Kieft
9,008,287 B2 * 4/2015 Mairs .................. H04L 65/4023
379/93.01

(Continued)

FOREIGN PATENT DOCUMENTS

WO 2006060794 A1 6/2006

OTHER PUBLICATIONS

Corpuz, Xandra; Tango Tip—Share Photos During a Video Call; http://www.tango.me/blog/tango-tip-shre-photos-during-a-video-call; Jul. 29, 2014; 1o pages.

(Continued)

Primary Examiner — Duyen M Doan
(74) Attorney, Agent, or Firm — Schmeiser, Olsen & Watts; Mark C. Vallone

(57) ABSTRACT

A method and system for generating an automated Internet connection is provided. The method includes receiving from a first communication hardware device of a first user, a first telephone number and a first Internet protocol (IP) address. A second telephone number and a second Internet protocol (IP) address are received from a second communication hardware device of a second user. A request for connecting the first communication hardware device to the second communication hardware device via an Internet connection is received and it is determined that the second communication hardware device is currently connected the first communication hardware device. The request is transmitted to the second communication hardware device. Based on the second user approving the request, the second IP address is automatically transmitted to the first communication device and a secure private Internet link between the first communication hardware device and the second communication hardware device is generated.

20 Claims, 4 Drawing Sheets

(58) Field of Classification Search
USPC .................................... 709/203, 217, 227
See application file for complete search history.

(56) References Cited

U.S. PATENT DOCUMENTS

| | | | |
|---|---|---|---|
| 9,071,950 B2* | 6/2015 | Mairs | H04L 67/14 |
| 9,264,299 B1* | 2/2016 | Palmer | H04L 41/0654 |
| 9,420,440 B2* | 8/2016 | Xu | H04W 4/16 |
| 2003/0074404 A1 | 4/2003 | Parker | |
| 2003/0088767 A1* | 5/2003 | Emerson, III | H04L 29/06027 |
| | | | 713/153 |
| 2005/0025294 A1* | 2/2005 | Matsuhashi | H04M 1/2535 |
| | | | 379/88.17 |
| 2007/0026852 A1 | 2/2007 | Logan | |
| 2007/0110033 A1* | 5/2007 | Tu | H04L 29/06027 |
| | | | 370/352 |
| 2008/0146256 A1 | 6/2008 | Hawkins | |
| 2011/0117941 A1 | 5/2011 | Zhang | |
| 2014/0134979 A1 | 5/2014 | Sen | |
| 2018/0034915 A1 | 2/2018 | Liu | |

OTHER PUBLICATIONS

Friedman, Mark J.; List of IBM Patents or Patent Applications Treated as Related; May 21, 2019; 1 page.

* cited by examiner

INDEPENDENT INTERNET CONNECTION GENERATION

CROSS REFERENCE TO RELATED APPLICATIONS

This application is a continuation application claiming priority to Ser. No. 15/220,919 filed Jul. 27, 2016, now U.S. Pat. No. 10,397,337, issued Aug. 27, 2019, the contents of which are hereby incorporated by reference.

FIELD

The present invention relates generally to a method for generating an Internet connection and in particular to a method and associated system for improving communications technology by generating an Internet connection between devices in response to telephone connection between the devices.

BACKGROUND

Communications between apparatuses typically includes an inaccurate process with little flexibility. Coordinating differing types of communication between apparatuses associated with different party types typically involves an unreliable process. Associating apparatuses with differing types of data flow may include a complicated process that may be time consuming and require a large amount of resources. Accordingly, there exists a need in the art to overcome at least some of the deficiencies and limitations described herein above.

SUMMARY

A first aspect of the invention provides an automated Internet connection method comprising: receiving, by a processor of a server from a first communication hardware device of a first user, a first telephone number and a first Internet protocol (IP) address associated with the first communication hardware device, wherein the first communication hardware device is communicatively connected to a second communication hardware device of a second user; receiving, by the processor from the second communication hardware, a second telephone number and a second Internet protocol (IP) address associated with the second communication hardware device, wherein the first communication hardware device is communicatively connected to the second communication hardware device via a telecommunications link; receiving, by the processor from the first user via the first communication hardware device, a request for connecting the first communication hardware device to the second communication hardware device via an Internet connection, wherein the request comprises the first telephone number and the second telephone number; determining, by the processor, that the second telephone number is registered with the server; determining, by the processor, that the second communication hardware device is currently communicatively connected to the first communication hardware device; transmitting, by the processor to the second communication hardware device, the request, wherein the second user approves the request via the second communication device; automatically transmitting to the first communication device, by the processor based on the second user approving the request, the second IP address; and generating, by the processor via the first IP address and the second IP address, a secure private Internet link between the first communication hardware device and the second communication hardware device.

A second aspect of the invention provides a computer program product, comprising a computer readable hardware storage device storing a computer readable program code, the computer readable program code comprising an algorithm that when executed by a processor of a server of a user implements an automated Internet connection method, the method comprising: receiving, by the processor from a first communication hardware device of a first user, a first telephone number and a first Internet protocol (IP) address associated with the first communication hardware device, wherein the first communication hardware device is communicatively connected to a second communication hardware device of a second user; receiving, by the processor from the second communication hardware, a second telephone number and a second Internet protocol (IP) address associated with the second communication hardware device, wherein the first communication hardware device is communicatively connected to the second communication hardware device via a telecommunications link; receiving, by the processor from the first user via the first communication hardware device, a request for connecting the first communication hardware device to the second communication hardware device via an Internet connection, wherein the request comprises the first telephone number and the second telephone number; determining, by the processor, that the second telephone number is registered with the server; determining, by the processor, that the second communication hardware device is currently communicatively connected to the first communication hardware device; transmitting, by the processor to the second communication hardware device, the request, wherein the second user approves the request via the second communication device; automatically transmitting to the first communication device, by the processor based on the second user approving the request, the second IP address; and generating, by the processor via the first IP address and the second IP address, a secure private Internet link between the first communication hardware device and the second communication hardware device.

A third aspect of the invention provides a server system comprising a processor coupled to a computer-readable memory device, the memory device comprising instructions that when executed by the processor implements an automated Internet connection method, the method comprising: receiving, by the processor from a first communication hardware device of a first user, a first telephone number and a first Internet protocol (IP) address associated with the first communication hardware device, wherein the first communication hardware device is communicatively connected to a second communication hardware device of a second user; receiving, by the processor from the second communication hardware, a second telephone number and a second Internet protocol (IP) address associated with the second communication hardware device, wherein the first communication hardware device is communicatively connected to the second communication hardware device via a telecommunications link; receiving, by the processor from the first user via the first communication hardware device, a request for connecting the first communication hardware device to the second communication hardware device via an Internet connection, wherein the request comprises the first telephone number and the second telephone number; determining, by the processor, that the second telephone number is registered with the server; determining, by the processor, that the second communication hardware device is currently communicatively connected to the first communication hardware device; transmitting, by the processor to the second communication hardware device, the request, wherein the second user approves the request via the second communication device; automatically transmitting to the first communication device, by the processor based on the second user approving the request, the second IP address; and generating, by the processor via the first IP address and the second IP address, a secure private Internet link between the first communication hardware device and the second communication hardware device.

The present invention advantageously provides a simple method and associated system capable of enabling communications between apparatuses.

DETAILED DESCRIPTION

Figure 1:
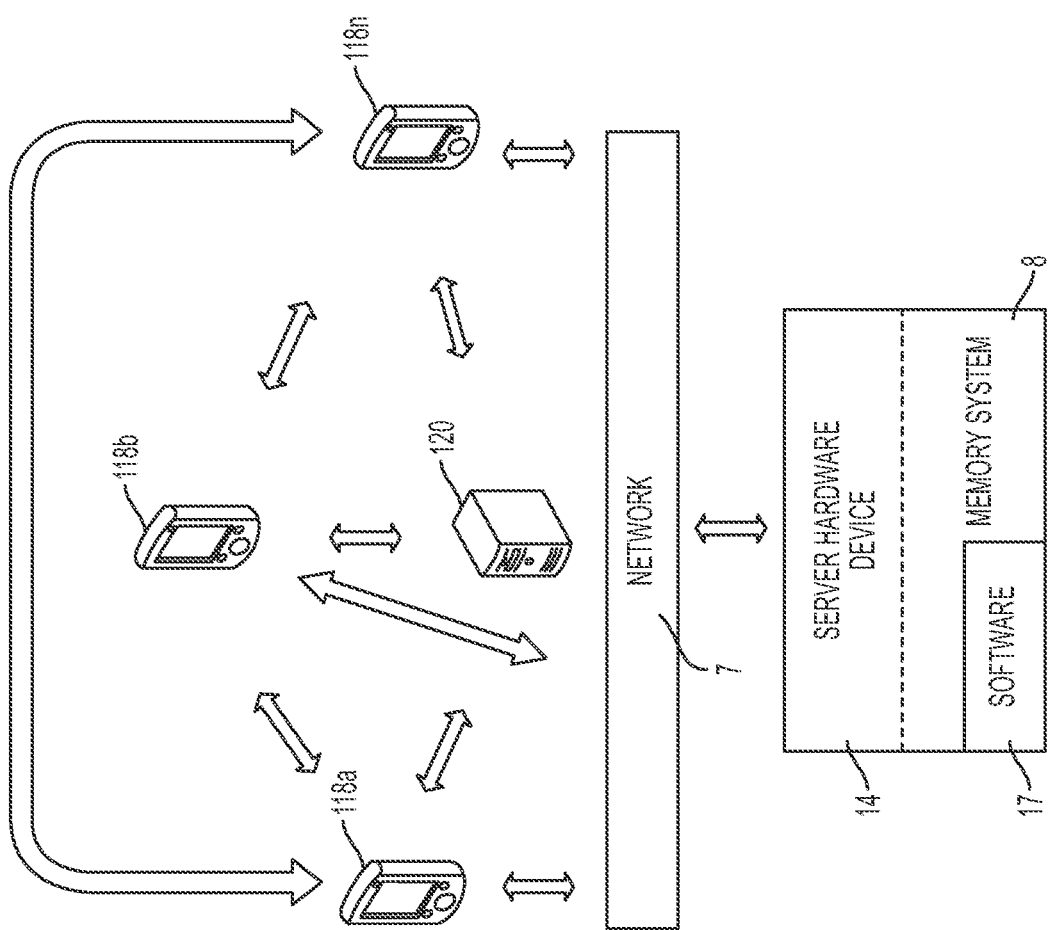
FIG. 1 illustrates a system for generating an Internet connection between devices during a telecom call, in accordance with embodiments of the present invention.

FIG. 1 illustrates a system 100 for generating an Internet connection between devices during a telecom call, in accordance with embodiments of the present invention. System 100 enables an improvement to a process for generating secure Internet connections between devices. Secure Internet connections between devices (during a telecom call) enable a secure transmission of video and text data between devices simultaneously during a telecom call. System 100 enables a process for generating an ad-hoc Internet connection between mobile device users and/or a call center user (via call center server 120) during a telecom call by:

1. Executing a mutual handshaking process via an intermediate communication server (e.g., server hardware device 14 of FIG. 1) during a connected telecom call. The handshaking process includes automatically transmitting telephone numbers, routing information, and IP addresses for connected (e.g., via a proxy or gateway) telecom devices (e.g., mobile devices 118a . . . 118n) to the intermediate communication server without prior registration.
2. Generating a point to point Internet connection (between mobile devices 118a . . . 118n) in response to a user request and based on the transmitted telephone numbers and IP addresses. The Internet connection (e.g., 3G connection, 4G connection, WIFI connection, etc.) is enabled to allow secure transmission of video, text, etc. data between devices during a telecom (voice) call.
3. Deleting the transmitted telephone numbers and IP addresses from the intermediate communication server in response to disconnecting (by any of the users) the telecom call and/or the Internet connection.

System 100 allows for:
1. Enabling secure internet connections between untrusted parties in order to retain privacy such that either party is unable to reconnect via the Internet connection upon termination of a phone call.
2. Improving the productivity of phone calls when ad-hoc information sharing is required via an Internet connection.
3. Improving call center productivity such that multimedia information may be immediately shared during a phone call.

System 100 of FIG. 1 includes a server hardware device 14 communicatively connected to communication hardware devices 118a . . . 118n and an optional call center server 120 via a network 118. Additionally, communication hardware devices 118a . . . 118n and call center server 120 may be directly communicatively connected to each other (e.g., via a telecom (telephone) link, a private Internet connection, etc.). Communication hardware devices 118a . . . 118n may comprise any type of mobile hardware communication device including, inter alia, a smart watch, a mobile phone, a PDA, a specialized hardware device, etc. Server hardware device 14 may comprise any type specialized hardware device, etc. Communication hardware devices 118a . . . 118n (i.e., control hardware internal to communication hardware devices 118a . . . 118n) and server hardware device 14 each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, communication hardware devices 118a . . . 118n (i.e., control hardware internal to communication hardware devices 118a . . . 118n) and server hardware device 14 may each comprise a specialized hardware device comprising specialized (non-generic) hardware and circuitry (i.e., specialized discrete non-generic analog, digital, and logic based circuitry) for executing a process described with respect to FIGS. 1-3. The specialized discrete non-generic analog, digital, and logic based circuitry may include proprietary specially designed components (e.g., a specialized integrated circuit designed for only implementing an automated process for generating an Internet connection between devices during a telecom call). Server hardware device 14 includes a memory system 8, software 17, and control hardware 19 (i.e., control hardware for enabling software 17 to execute a process for automatically generating an Internet connection between devices during a telecom call). The memory system 8 may include a single memory system. Alternatively, the memory system may include a plurality of memory systems. Network 7 may include any type of network including, inter alia, a local area network, (LAN), a wide area network (WAN), the Internet, a wireless network, etc.

The following steps detail a process for generating an Internet connection between communication hardware devices 118a . . . 118n and/or optional call center server 120 during a telecom call as follows:
1. A first user places a telephone call (via a communication device) to a second user (via a communication device). The second user may be an acquaintance or a call center (e.g., a technical support center) user.
2. In response to the telephone call, a phone number and IP address for each of the users is automatically transmitted to a server such as server hardware device 14 of FIG. 1.

3. An Internet connection request is transmitted to the server in response to a command from a caller user of the users. The Internet connection request is initiated in order to transfer video or text data between the users during the telephone call.

4. In response to the Internet connection request, the server forwards the request to a callee user and the server transmits the callee's IP address to the caller and an Internet connection is established and data is transmitted between the users.

5. When the telephone call is terminated, the telephone numbers and IP addresses (retrieved during the telephone call) are automatically deleted from the server.

Figure 2B:
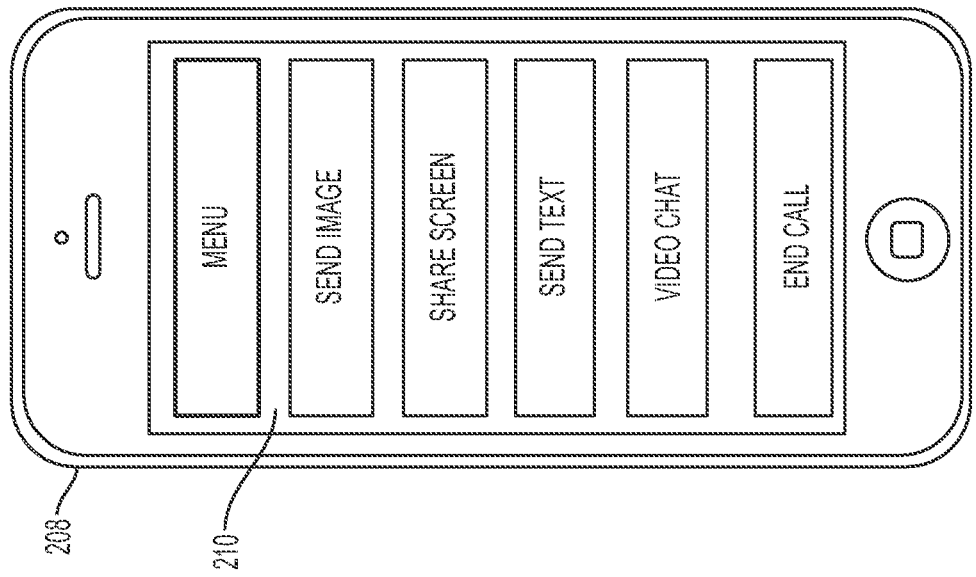
FIG. 2B illustrates an alternative GUI enabled by the system of FIG. 1, in accordance with embodiments of the present invention.
Figure 2A:
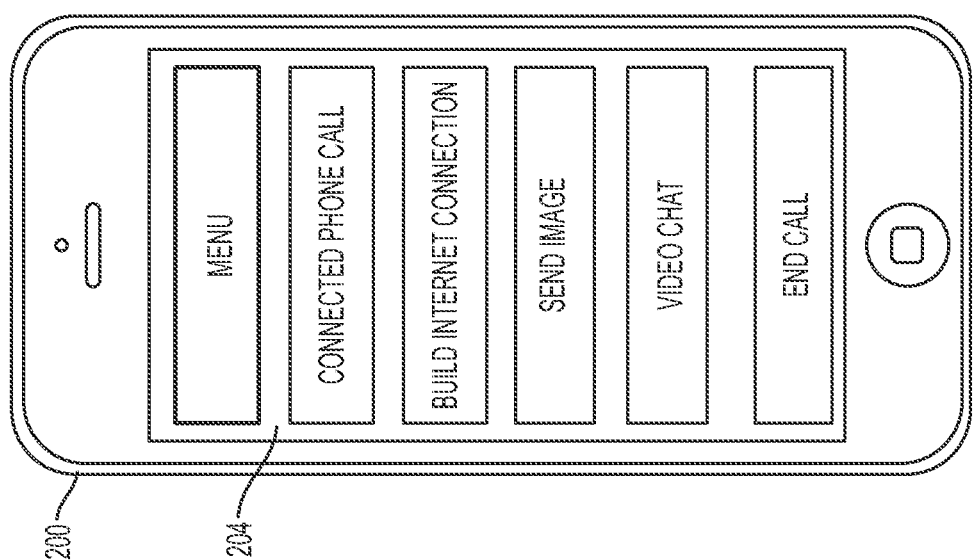
FIG. 2A illustrates a graphical user interface (GUI) enabled by the system of FIG. 1, in accordance with embodiments of the present invention.

FIG. 2A illustrates a graphical user interface (GUI) 204 enabled by system 100 of FIG. 1, in accordance with embodiments of the present invention. GUI 204 presents a menu via a mobile device 200 (of a user) in communication with a call center for presentation of data to the user. The menu will pushed to user's phone after connection to the call center. The menu allows the user to simultaneously talk with the call center while accessing the menu for retrieval of video data for visual presentation.

FIG. 2B illustrates a graphical user interface (GUI) 208 enabled by system 100 of FIG. 1, in accordance with embodiments of the present invention. GUI 208 presents a menu via a mobile device 210 (of a user) in communication with another user (of a mobile device) for presentation of data to the user. The menu will pushed to a receiving (of a phone call) user's phone after connection of the phone call. The menu allows the users to simultaneously talk while accessing the menu for retrieval and transmission of video data for visual presentation.

Figure 3:
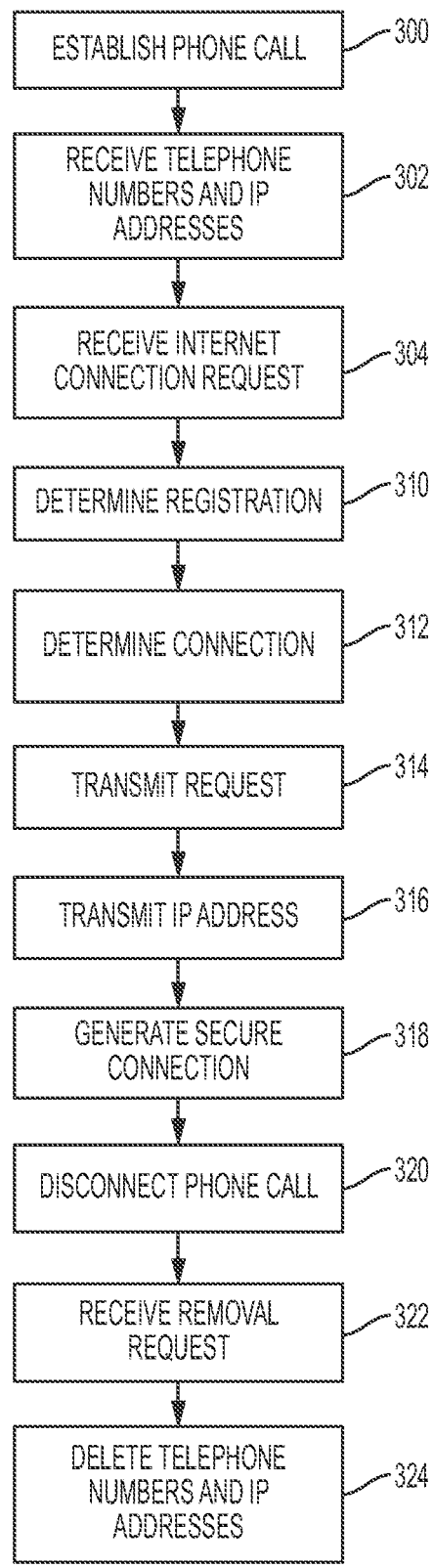
FIG. 3 illustrates an algorithm detailing a process flow enabled by the system of FIG. 1 for generating an Internet connection between devices during a telecom call, in accordance with embodiments of the present invention.

FIG. 3 illustrates an algorithm detailing a process flow enabled by system 100 of FIG. 1 for generating an Internet connection between devices during a telecom call, in accordance with embodiments of the present invention. Each of the steps in the algorithm of FIG. 3 may be enabled and executed in any order by a computer processor(s) or any type of specialize d hardware executing computer code. In step 300, a telephone call between a first user (via a first communication device) and a second user (via a second communication device) is established. The second user may be an acquaintance of the first user. Alternatively, the second user may comprise a call center user. In step 302, a first telephone number and a first IP address associated with a first communication hardware device is automatically received (from the first communication hardware device) by a server. Additionally, a second telephone number and a second IP address associated with the second communication hardware device is automatically received (from the second communication hardware device) by the server. In step 304, the server receives a request for connecting the first communication hardware device to the second communication hardware device via an Internet connection. The request includes the first telephone number and the second telephone number. In step 310, it is determined that the second telephone number is registered with the server. In step 312, it is determined that the second communication hardware device is currently communicatively connected to the first communication hardware device. In step 314, the request is transmitted from the server to the second communication hardware device and the second user approves the request via the second communication device. In step 316, the second IP address is automatically transmitted to the first communication device based on the results of step 314. In step 318, a secure private Internet link between the first communication hardware device and the second communication hardware device is generated via the first IP address and said second IP address. Visual data may be transmitted between the first communication hardware device and the second communication hardware device via the secure private Internet link. Additionally, a GUI may be presented (via the secure private Internet link) via the communication hardware devices. In step 320, the telephone call is disconnected (e.g., the users have completed the telephone call). In step 322, the server automatically receives (from the first communication hardware device and the second communication hardware device) a removal request for removing the first telephone number, the first IP address, the second telephone number, and the second IP address from the server. In step 324, the first telephone number, the first IP address, the second telephone number, and the second IP address are removed from the server in response to the request of step 322.

Figure 4:
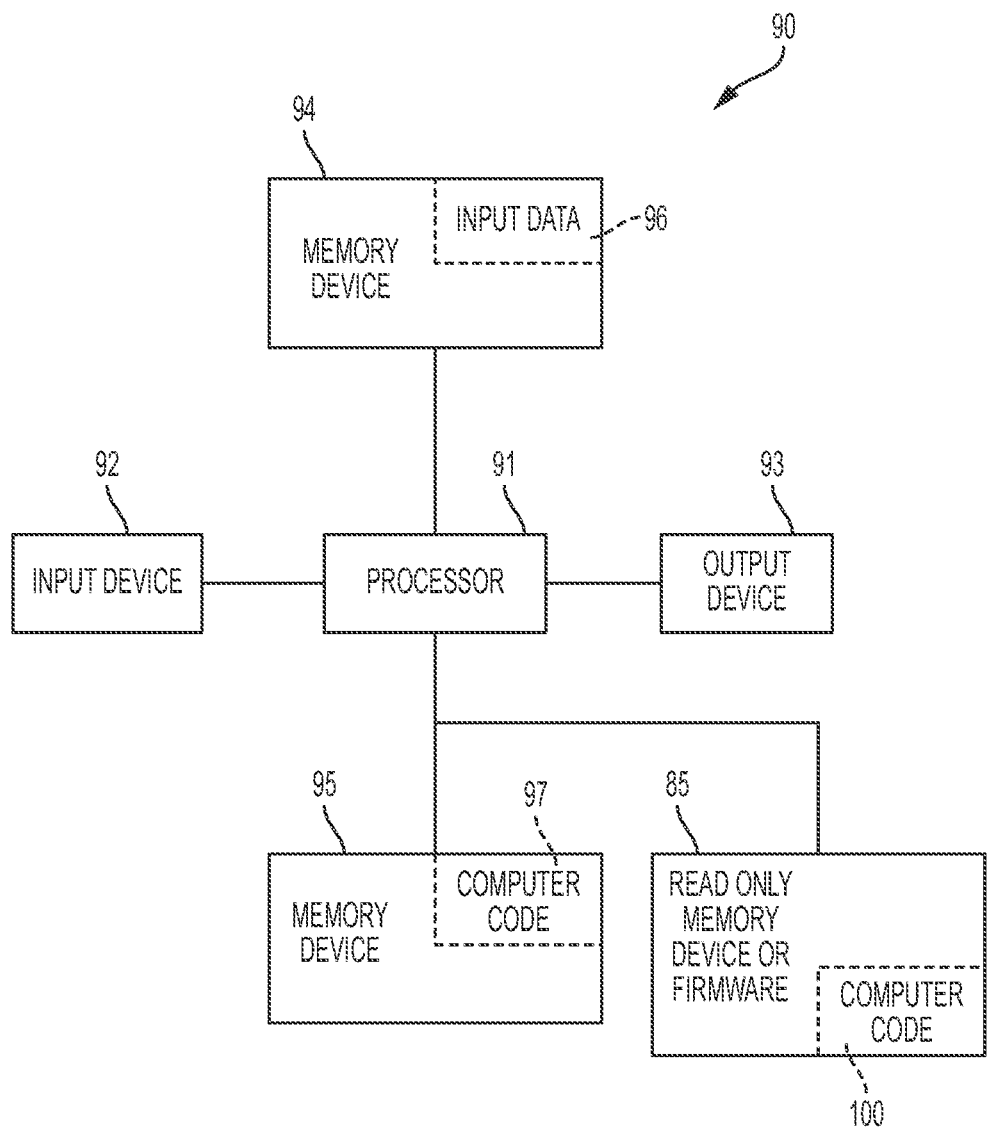
FIG. 4 illustrates a computer system used by the system of FIG. 1 for enabling a process for generating an Internet connection between devices during a telecom call, in accordance with embodiments of the present invention.

FIG. 4 illustrates a computer system 90 (e.g., communication hardware devices 118a . . . 118n and server hardware device 14) used by or comprised by the system of FIG. 1 for enabling a process for generating an Internet connection between devices during a telecom call, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alfa, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 3) for generating an Internet connection between devices during a telecom call. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms (e.g., the algorithm of FIG. 3) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithm of FIG. 3) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to enable a process for generating an Internet connection between devices during a telecom call. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for generating an Internet connection between devices during a telecom call. In another embodiment, the invention provides a business method that performs the process steps of the invention on a subscription, advertising, and/or fee basis. That is, a service supplier, such as a Solution Integrator, could offer to enable a process for generating an Internet connection between devices during a telecom call. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated Internet connection method comprising:
   receiving, by a processor of a server from a first communication hardware device of a first user, a first telephone number and a first Internet protocol (IP) address associated with said first communication hardware device, wherein said first communication hardware device is communicatively connected to a second communication hardware device of a second user;
   receiving, by said processor from said second communication hardware device, a second telephone number and a second Internet protocol (IP) address associated with said second communication hardware device, wherein said first communication hardware device is communicatively connected to said second communication hardware device via a telecommunications link;
   receiving, by said processor from said first user via said first communication hardware device, a request for connecting said first communication hardware device to said second communication hardware device via an Internet connection, wherein said request comprises said first telephone number and said second telephone number, wherein said second telephone number is registered with said server;
   transmitting, by said processor to said second communication hardware device in response to determining that said second communication hardware device is currently communicatively connected to said first communication hardware device, said request, wherein said second user approves said request via said second communication device;
   automatically transmitting to said first communication device, by said processor based on said second user approving said request, said second IP address;
   generating, by said processor via said first IP address and said second IP address, a secure private ad-hoc Internet link between said first communication hardware device and said second communication hardware device;
   disconnecting, by said processor, said second communication hardware device from said first communication hardware device via said secure private ad-hoc Internet link such that said first communication hardware device is unable to reconnect to said second communication hardware device via said secure private ad-hoc Internet link;
   receiving, by said processor from said first communication hardware device and said second communication hardware device, a removal request for removing said first telephone number, said first IP address, said second telephone number, and said second IP address from said server; and
   automatically deleting, by said processor in response to said receiving said removal request, said first telephone number, said first IP address, said second telephone number, and said second IP address from said server.

2. The method of claim 1, further comprising:
   transmitting, by said processor via said secure private Internet link, visual data between said first communication hardware device and said second communication hardware device.

3. The method of claim 1, further comprising:
   registering, by said processor, said first user, said first communication hardware, said second user, and said second communication hardware device with said server.

4. The method of claim 1, further comprising:
   authenticating, by said processor, said first user, said first communication hardware, said second user, and said second communication hardware device.

5. The method of claim 1, further comprising:
   presenting, by said processor via said secure private Internet link, a graphical user interface (GUI) interface to said first user via said first communication hardware and to said second user via said second communication hardware device.

6. The method of claim 5, further comprising:
   transmitting, by said processor via said GUI, image data between said first communication hardware and said second communication hardware device.

7. The method of claim 1, wherein said first communication hardware device, said second communication hardware device, and said sever each comprise a specialized hardware device.

8. The method of claim 1, further comprising:
   receiving, by said processor from said first communication hardware device first routing data associated with said first communication hardware device;
   receiving, by said processor from said second communication hardware device, second routing associated with said second communication hardware device; and
   automatically transmitting to said first communication device, by said processor based on said second user approving said request, said second routing data, wherein said generating said secure private Internet link is further generated via said first routing data and said second routing data.

9. The method of claim 1, further comprising:
providing at least one support service for at least one of creating, integrating, hosting, maintaining, and deploying computer-readable code in the control hardware, said code being executed by the computer processor to implement: said receiving said first telephone number and said first IP address, said receiving said second telephone number and said second IP address, said receiving said request, said transmitting, said automatically transmitting, and said generating.

10. A computer program product, comprising a computer readable hardware storage device storing a computer readable program code, said computer readable program code comprising an algorithm that when executed by a processor of a server of a user implements an automated Internet connection method, said method comprising:
receiving, by said processor from a first communication hardware device of a first user, a first telephone number and a first Internet protocol (IP) address associated with said first communication hardware device, wherein said first communication hardware device in communicatively connected to a second communication hardware device of a second user;
receiving, by said processor from said second communication hardware device, a second telephone number and a second Internet protocol (IP) address associated with said second communication hardware device, wherein said first communication hardware device is communicatively connected to said second communication hardware device via a telecommunications link;
receiving, by said processor from said first user via said first communication hardware device, a request for connecting said first communication hardware device to said second communication hardware device via an Internet connection, wherein said request comprises said first telephone number and said second telephone number, wherein said second telephone number is registered with said server;
transmitting, by said processor to said second communication hardware device in response to determining that said second communication hardware device is currently communicatively connected to said first communication hardware device, said request, wherein said second user approves said request via said second communication device;
automatically transmitting to said first communication device, by said processor based on said second user approving said request, said second IP address;
generating, by said processor via said first IP address and said second IP address, a secure private ad-hoc Internet link between said first communication hardware device and said second communication hardware device;
disconnecting, by said processor, said second communication hardware device from said first communication hardware device via said secure private ad-hoc Internet link such that said first communication hardware device is unable to reconnect to said second communication hardware device via said secure private ad-hoc Internet link;
receiving, by said processor from said first communication hardware device and said second communication hardware device, a removal request for removing said first telephone number, said first IP address, said second telephone number, and said second IP address from said server; and
automatically deleting, by said processor in response to said receiving said removal request, said first telephone number, said first IP address, said second telephone number, and said second IP address from said server.

11. The computer program product of claim 10, wherein said method further comprises:
transmitting, by said processor via said secure private Internet link, visual data between said first communication hardware device and said second communication hardware device.

12. The computer program product of claim 10, wherein said method further comprises:
registering, by said processor, said first user, said first communication hardware, said second user, and said second communication hardware device with said server.

13. The computer program product of claim 10, wherein said method further comprises:
authenticating, by said processor, said first user, said first communication hardware, said second user, and said second communication hardware device.

14. The computer program product of claim 10, wherein said method further comprises:
presenting, by said processor via said secure private Internet link, a graphical user interface (GUI) interface to said first user via said first communication hardware and to said second user via said second communication hardware device.

15. The computer program product of claim 14, wherein said method further comprises:
transmitting, by said processor via said GUI, image data between said first communication hardware and said second communication hardware device.

16. The computer program product of claim 10, wherein said first communication hardware device, said second communication hardware device, and said sever each comprise a specialized hardware device.

17. A server system comprising a processor coupled to a computer-readable memory device, said memory device comprising instructions that when executed by the processor implements an automated Internet connection method, said method comprising:
receiving, by said processor from a first communication hardware device of a first user, a first telephone number and a first Internet protocol (IP) address associated with said first communication hardware device, wherein said first communication hardware device in communicatively connected to a second communication hardware device of a second user;
receiving, by said processor from said second communication hardware device, a second telephone number and a second Internet protocol (IP) address associated with said second communication hardware device, wherein said first communication hardware device is communicatively connected to said second communication hardware device via a telecommunications link;
receiving, by said processor from said first user via said first communication hardware device, a request for connecting said first communication hardware device to said second communication hardware device via an Internet connection, wherein said request comprises said first telephone number and said second telephone number, wherein said second telephone number is registered with said server;

transmitting, by said processor to said second communication hardware device in response to determining that said second communication hardware device is currently communicatively connected to said first communication hardware device, said request, wherein said second user approves said request via said second communication device;

automatically transmitting to said first communication device, by said processor based on said second user approving said request, said second IP address;

generating, by said processor via said first IP address and said second IP address, a secure private ad-hoc Internet link between said first communication hardware device and said second communication hardware device;

disconnecting, by said processor, said second communication hardware device from said first communication hardware device via said secure private ad-hoc Internet link such that said first communication hardware device is unable to reconnect to said second communication hardware device via said secure private ad-hoc Internet link;

receiving, by said processor from said first communication hardware device and said second communication hardware device, a removal request for removing said first telephone number, said first IP address, said second telephone number, and said second IP address from said server; and automatically deleting, by said processor in response to said receiving said removal request, said first telephone number, said first IP address, said second telephone number, and said second IP address from said server.

18. The server system of claim 17, wherein said second communication hardware device is currently disconnected from said first communication hardware device, and wherein said method further comprises:

receiving, by said processor from said first communication hardware device and said second communication hardware device, a removal request for removing said first telephone number, said first IP address, said second telephone number, and said second IP address from said server; and deleting, by said processor in response to said receiving said removal request, said first telephone number, said first IP address, said second telephone number, and said second IP address.

19. The server system of claim 17, wherein said method further comprises:

registering, by said processor, said first user, said first communication hardware, said second user, and said second communication hardware device with said server.

20. The server system of claim 17, wherein said method further comprises:

authenticating, by said processor, said first user, said first communication hardware, said second user, and said second communication hardware device from said server.

* * * * *